Patented Dec. 8, 1953

2,662,057

UNITED STATES PATENT OFFICE 2,662,057

LUBRICATING COMPOSITIONS

Paul R. McCarthy, Allison Park, Pa., assignor to Gulf Research & Development Company, Pittsburgh, Pa., a corporation of Delaware No Drawing. Application June 30, 1949, Serial No. 102,446

5 Claims. (Cl. 252—49.7)

This invention relates to improved lubricating compositions and, more particularly, to the class of lubricants existing as plastic solids or jellies in which are combined good resistance to water leaching, good oxidation stability, and good mechanical and lubricating properties over a wide temperature range.

Plastic lubricating compositions suitable for general use throughout the mechanical arts, as for example in lubricating wheel bearings, ball or roller bearings in light machinery, pump packing glands and the like, spindles, chassis and universal joints, etc., should possess good resistance to leaching by water or moisture combined with good mechanical characteristics at the moderately elevated temperatures often encountered in such applications. Among the characteristics desirable in such compositions there may be mentioned: good chemical stability and mechanical adhesion, an ASTM dropping point of about 300° F. or higher, good bearing retention, and resistance to failure under load.

While it has been possible in the past to formulate grease compositions having good resistance to leaching by water, as well as compositions having desirable mechanical characteristics, attempts to combine these two properties have met with difficulty since ingredients which promote leaching resistance detract from the desirable mechanical properties and ingredients which improve the mechanical properties detract from the leaching resistance. For the most part, resistance to water leaching can be effected by including in grease compositions relatively large proportions of calcium base soaps, but such soaps adversely affect the mechanical characteristics. Alternatively, good mechanical properties can be secured through the use of sodium base soaps, but such soaps are water-soluble and adversely affect leaching resistance.

Compositions having the consistency of a grease can be prepared by dispersing compounds of bentonite with organic bases in a lubricating oil. These compositions, however, are not satisfactory with respect to their oxygen stability. In the past when it has been desired to improve the oxygen stability of lubricants, striking results have been obtained by incorporating in the lubricant a phenolic compound, particularly an alkylated phenol such as, for example, tri-tert-butyl-phenol, 2,6 - di-tert-butyl-4-methylphenol, and the like. I have found, however, that these phenolic compounds are not satisfactory for the grease-like compositions made from a lubricating oil and a bentonite-organic base compound.

In its broad aspect, the present invention therefore relates to the use of a particular class of compounds which I have discovered to be of marked utility in preventing the deterioration of lubricating compositions comprising compounds of bentonite with organic bases dispersed in an oil (as contrasted with lubricating compositions prepared from a soap and an oil). The invention is based upon the discovery that a diaryl amine is remarkably effective in inhibiting oxidation of compositions obtained when a compound of bentonite with an organic base is dispersed in a lubricating oil. The proportions of the constituents are such as to produce compositions having the consistency of a grease, good resistance to leaching by water and good oxidation stability combined with good mechanical and lubricating characteristics. The compound of bentonite with an organic base in accordance with a preferred embodiment of the invention, is intimately dispersed in an oil by introducing the oil and the compound in the desired proportions into a mixing device such as a paint mill or a colloid mill, and repeatedly passing the mixture in plastic form through the mixing device to subject the mixture to mechanical shearing action until the desired degree of dispersion of the compound in the oil is obtained. The diaryl amine ordinarily is added to the oil before it is mixed with the compound. If desired, however, the constituents may be added separately to the mixing device.

As examples of some of the daryl amines which may be used in the compositions of this invention may be mentioned diphenylamine, phenyl alpha naphthylamine, phenyl beta naphthylamine, alpha alpha, alpha beta, beta beta dinaphthylamines, and the like. Other diaryl amines as well as their derivatives wherein one or more hydrogen atoms on one or both of the aromatic nuclei are replaced by a substituent group may be used. The substituting group may, for example, be one selected from the class of aryl, alkyl, amino, aryloxy and alkyloxy radicals, so long as the presence of the substituent does not render the diaryl amine insoluble in oil, or soluble in water or otherwise adversely affect the effectiveness of the diaryl amine. The amount of the diaryl amine employed will depend to a large extent upon the severity of the conditions to which the composition is subjected, as well as the particular diaryl amine used. For instance when the composition is subjected to prolonged use under oxidizing conditions, such as under extreme temperature and pressure, the diaryl amine requirement will be much greater than when relatively mild operating conditions are encountered. Generally, however, the amount of the diaryl amine employed is between about 0.1 and 1.5 per cent by weight based upon the weight of the total composition. In any case, an amount sufficient to substantially inhibit oxidational deterioration is employed.

The mineral oil ingredient in the compositions provided by this invention may be any of the hydrocarbon oils of lubricating grade, such as customarily used in compounding greases. The oil may be a refined or semi-refined paraffinic-, naphthenic-, or asphaltic-base oil having a viscosity of about 50 to 4000 SUS at 100° F. If desired, a blend of oils of suitable viscosity may be employed instead of a single oil, by means of which any desired viscosity within the range of 50 to 4000 SUS at 100° F. may be secured. The viscosity of the oil has little effect on the dropping point of the compositions, but more viscous oils produce compositions having greater stickiness and adhesive properties than do the lighter oils. The oil content of the compositions prepared according to this invention may comprise about 70 to about 95 per cent or more by weight of the total composition. The particular oil as well as the exact amount of oil employed depends upon the characteristics desired in the final composition.

The bentonite compounds employed in accordance with the invention are compounds composed of a montmorillonite mineral in which at least a part of the cation content of the mineral has been replaced by an organic base. Clays that swell at least to some extent on being contacted with water and contain as a primary constituent a mineral of the group known as montmorillonites are generally referred to as bentonites. Such clays, which contain exchangeable alkali metal atoms either naturally or after treatment, constitute the raw materials employed in making the bentonite-organic base compounds used in the compositions of this invention. So far as known, all naturally occurring montmorillonites contain some magnesium and certain of them, as exemplified by Hector clay, contain such a high percentage of magnesium that they largely have magnesium in place of the aluminum content characteristic of the more typical montmorillonites.

The bentonite-organic base compounds are preferably prepared as described in U. S. Patent No. 2,033,856, issued March 10, 1936, by bringing together the bentonite and the organic base in the presence of aqueous mineral acid to effect base exchange. The organic bases should preferably be titratable with mineral acids. Among these reactive bases are many alkaloids, and cyclic, aliphatic, and heterocyclic amines. The bentonite-organic base compounds used in preparing the lubricating compositions of this invention are preferably those prepared by bringing together a bentonite clay and such organic bases as aliphatic amines, their salts, and quaternary ammonium salts. Examples of such amines and salts are: decylamine, dodecylamine, tetradecylamine, hexadecylamine, octadecylamine, hexadecyl ammonium acetate, octadecyl ammonium acetate, dimethyldioctyl ammonium acetate, dimethyldidodecyl ammonium acetate, dimethyldodecylhexadecyl ammonium acetate, dimethyldicetyl ammonium acetate, dimethylhexadecyloctadecyl ammonium acetate, dimethyldioctadecyl ammonium acetate, and the corresponding chlorides and quaternary ammonium chlorides. The organic bases employed should be such as to impart substantial organophilic properties to the resulting compounds. The preferred bentonite compounds are prepared from quaternary ammonium compounds in which the N-substituents are aliphatic groups containing at least one alkyl group with a total of at least 10 to 12 carbon atoms. When aliphatic amines are used they preferably contain at least one alkyl group containing at least 10 to 12 carbon atoms.

The amount of bentonite compound used may vary over wide limits depending upon the particular oil with which the bentonite compound is to be blended and upon the properties desired in the final lubricating composition. While as much as 30 per cent by weight of the total composition may comprise the bentonite compound, I prefer to use smaller amounts, that is, in the order of about 5 to 15 per cent by weight. It should be understood, however, that depending upon the consistency of the composition desired, less than 5 per cent or more than 15 per cent of the bentonite compound may be employed. When the composition contains less than 5 per cent of the bentonite compound very little gelling occurs. Compositions containing less than 5 per cent of the bentonite compound are semi-fluid in nature and have penetrations in the order of about 400. Compositions containing more than about 30 per cent by weight of the bentonite compound are very stiff. The consistency-temperature relation of compositions containing as much as 30 per cent of the bentonite compound indicates that these compositions would be suitable for use where block greases are desired such as in the open journal bearings of paper mill driers and the trunnion bearings of rotary kilns. When a bentonite compound is mentioned, it is understood, of course, that one or more of such compounds is intended.

In some instances, as when using short or single chain aliphatic amine bentonite compounds for example, dispersion of the organic bentonite compound in the oil can be facilitated by the use of one or more solvating agents. Suitable solvating agents are polar organic compounds such as organic acids, esters, alcohols, ethers, ketones, and aldehydes, especially low molecular weight compounds of these classes. Examples of suitable solvating agents are: ethyl acetate, acetic acid, acetone, methyl alcohol, ethyl alcohol, benzoyl chloride, butyl stearate, cocoanut oil, cyclohexanone, ethylene dichloride, ethyl ether, furfural, isoamyl acetate, methyl ethyl ketone, and nitrobenzene. In cases where the use of a solvating agent is desirable for effecting more rapid and more complete dispersion of the organic bentonite compound in the oil, ordinarily only a relatively small amount of such agent may be necessary. However, as much as about 50 per cent by weight based on the amount of the bentonite compound can be used.

The characteristics of a lubricating composition consisting of a dispersion of dimethyldicetyl ammonium bentonite in a mineral lubricating oil having a viscosity of 255 SUS at 100° F. and containing phenyl alpha naphthylamine are shown in Table I. The oxygen stability of the composition with and without the phenyl alpha naphthylamine is also illustrated.

*Table I*

| Composition (parts by weight): | |
|---|---|
| Oil | 85 |
| Dimethyldicetyl ammonium bentonite | 15 |
| Phenyl alpha naphthylamine | 0.4 |
| Consistency (A. S. T. M. D217-4:T): | |
| Unworked | 232 |
| Worked | 247 |
| Dropping point (A. S. T. M. D566-42), °F | >450 |
| Oil separation, percent | 0.33 |
| Water resistance (rotating rack; water sprayed at rate of 500 cc./min. for 15 min.): | |
| Percent lubricant retention at 80° F | 94 |
| Percent lubricant retention at 100° F | 93 |
| Percent lubricant retention at 120° F | 90 |
| Percent lubricant retention at 140° F | 91 |
| Percent lubricant retention at 160° F | 90 |
| Percent lubricant retention at 180° F | 89 |
| Metal adhesion: | |
| Percent lubricant retention at 80° F | 100 |
| Percent lubricant retention at 100° F | 100 |
| Percent lubricant retention at 120° F | 100 |
| Percent lubricant retention at 140° F | 100 |
| Percent lubricant retention at 160° F | 100 |
| Percent lubricant retention at 180° F | 100 |
| Percent lubricant retention at 200° F | 100 |
| Bearing test data: | |
| Starting torque at 80° F | 600 |
| Starting torque at 150° F | 120 |
| Starting torque at 220° F | 180 |
| Final running torque at 80° F | 60 |
| Final running torque at 150° F | 60 |
| Final running torque at 220° F | 60 |
| Percent lubricant retention at 80° F | 93.2 |
| Percent lubricant retention at 150° F | 89.3 |
| Percent lubricant retention at 220° F | 61.7 |
| Percent lubricant thrown out at 80° F | 4.4 |
| Percent lubricant thrown out at 150° F | 16.3 |
| Percent lubricant thrown out at 220° F | 27.7 |
| Percent lubricant leakage at 80° F | 2.3 |
| Percent lubricant leakage at 150° F | 4.7 |
| Percent lubricant leakage at 220° F | 10.6 |
| Low temperature torque (204P ball bearing, GM-Cm for first revolution): At −20° F | 1,312 |

| Oxygen Stability (Norma Hoffman method) (pounds pressure drop) | Inhibited | Uninhibited |
|---|---|---|
| At 50 hours | 1.5 | 90 |
| At 100 hours | 3.5 | |
| At 300 hours | 10.0 | |
| At 500 hours | 13.0 | |

It is apparent from these results that a compound of bentonite with an organic base dispersed in an oil and containing a diaryl amine produces a lubricating composition having good consistency values, high dropping points, low oil separation, good resistance to leaching by water, good B. E. C. test characteristics, excellent metal adhesion properties and good oxygen stability.

Another lubricating composition was prepared from 94 parts by weight of an oil having a viscosity of 58 SUS at 100° F. and 6 parts by weight of dimethyldicetyl ammonium bentonite. This composition was substantially completely inhibited by the addition of 0.2 part by weight of diphenylamine, the pounds pressure drop being only 3, 6 and 12, after 50, 100 and 300 hours, respectively. The consistency of this composition was 275 unworked and 285 worked. The dropping point was greater than 450° F. and the oil separation only 0.8 per cent. According to torque measurements this composition had a low temperature torque of 565 at 0° F. and 698 at −40° F. The final running torque was 180 at each of the temperatures employed, i. e., 80°, 150° and 220° F.

In the above table the bearing test referred to was carried out by subjecting a Hoover No. 7404 ball bearing assembly filled with 5.5 grams of the lubricant to 20 minute runs at each of the temperatures 80° F., 150° F., and 220° F. in a B. E. C. grease testing apparatus. At the end of each run weighings were made to determine the amount of lubricant retained in the bearing, the amount thrown out of the bearing by centrifugal force, and the amount running out of the bearing raceway, i. e., the leakage. This test was developed by the Bearing Engineers Committee of the Anti-Friction Bearing Manufacturers Association. This test was developed for studying the structural stability of greases when agitated in a working ball bearing under specified conditions at known temperatures. The machine and the test method were described in a paper presented by C. R. Gillette at a meeting of the National Association of Grease Manufacturers, Incorporated, at Chicago, Illinois, October 12–13, 1936.

The oil separation test referred to in the table was carried out by filling a 1½ inch nickel filter cone with the lubricant and placing the cone in a tared beaker. The beaker and cone were placed in an oven maintained at a temperature of 212° F. for 24 hours, after which the beaker was weighed and the gain in weight calculated as per cent oil separation.

The adhesion test was carried out by filling a tared 1½ inch concave disc (center depressed $\frac{3}{32}''$) with the lubricant and spinning it at 1800 R. P. M. for seven minutes, after which the disc was weighed and the difference in weight calculated as per cent loss.

In order to demonstrate the effect of various compounds on the oxygen stability of compositions prepared from an oil and a bentonite-organic base compound, a number of different compositions were prepared. The oxygen stability of these compositions by the Norma Hoffman method is illustrated in Table II. The oil used in preparing these compositions was a solvent refined Texas oil having a viscosity of 300 SUS at 100° F.

*Table II*

| | A | B | C | D |
|---|---|---|---|---|
| Composition (parts by weight): | | | | |
| Oil | 85 | 85 | 85 | 85 |
| Dimethyldicetyl ammonium bentonite | 15 | 15 | 15 | 15 |
| 2,6-di-tert-butyl-4-methylphenol | | 0.5 | | |
| Diphenylamine | | | 0.5 | |
| Phenyl alpha naphthylamine | | | | 0.5 |
| Oxygen stability (pounds pressure drop): | | | | |
| At 50 hours | 31.5 | 31 | 1.0 | 0.0 |
| At 100 hours | (68 hrs.) 59 | 50+ | 2.0 | 0.5 |
| At 150 hours | | | 3.0 | 2.5 |
| At 200 hours | | | 4.2 | 2.5 |

It will be noted from the above data that composition B which was inhibited with an alkylated phenol was not much more stable than the uninhibited composition A. However, compositions C and D, which contain a diaryl amine, have good oxidation stability.

While this invention has been described with reference to specific details and examples of the production and properties of the compositions of my invention, it is to be understood that the invention is not intended to be limited to such details and examples, except as recited hereinafter in the appended claims.

I claim:

1. An improved lubricant consisting essentially of a dispersion of a compound of a bentonite and an organic nitrogen base in a major amount of a mineral oil and a diaryl amine, wherein the amount of said bentonite compound in said lubricant is sufficient to produce a composition having the consistency of a grease and wherein the amount of said diaryl amine is sufficient to stabilize the lubricant against oxidational deterioration.

2. An improved lubricant consisting essentially of a dispersion of a compound of a bentonite and an organic nitrogen base in a major amount of a mineral oil and a diaryl amine, wherein said bentonite compound is present in said lubricant in an amount corresponding to about 5 to about 30 per cent by weight of the lubricant and wherein said diaryl amine is present in said lubricant in an amount corresponding to about 0.1 to 1.5 per cent by weight of the lubricant.

3. An improved lubricant consisting essentially of a dispersion of a compound of a bentonite and an aliphatic organic nitrogen base in a major amount of a mineral oil and a diaryl amine, wherein said bentonite compound is present in said lubricant in an amount corresponding to about 5 to about 15 per cent by weight of the lubricant and wherein said diaryl amine is present in said lubricant in an amount corresponding to about 0.1 to 1.5 per cent by weight of the lubricant.

4. An improved lubricant consisting essentially of a dispersion of dimethyldicetyl ammonium bentonite in a major amount of a mineral oil and phenyl alpha naphthylamine, wherein said bentonite compound is present in said lubricant in an amount corresponding to about 5 to about 15 per cent by weight of the lubricant and wherein said phenyl alpha naphthylamine is present in said lubricant in an amount corresponding to about 0.1 to 1.5 per cent by weight of the lubricant.

5. An improved lubricant consisting essentially of a dispersion of dimethyldicetyl ammonium bentonite in a major amount of a mineral oil and diphenylamine, wherein said bentonite compound is present in said lubricant in an amount corresponding to about 5 to about 15 per cent by weight of the lubricant and wherein said diphenylamine is present in said lubricant in an amount corresponding to about 0.1 to 1.5 per cent by weight of the lubricant.

PAUL R. McCARTHY.

References Cited in the file of this patent

UNITED STATES PATENTS

| Number | Name | Date |
|---|---|---|
| 2,248,636 | Marsden | July 8, 1941 |
| 2,260,625 | Kistler | Oct. 28, 1941 |
| 2,435,655 | Rhodes et al. | Feb. 10, 1948 |
| 2,531,440 | Jordan | Nov. 28, 1950 |
| 2,554,222 | Stross | May 22, 1951 |